(12) United States Patent
Barve et al.

(10) Patent No.: US 6,301,640 B2
(45) Date of Patent: *Oct. 9, 2001

(54) SYSTEM AND METHOD FOR MODELING AND OPTIMIZING I/O THROUGHPUT OF MULTIPLE DISKS ON A BUS

(75) Inventors: Rakesh D. Barve, Durham, NC (US); Phillip B. Gibbons, Westfield; Bruce K. Hillyer, Lebanon, both of NJ (US); Yossi Matias, Potomac, MD (US); Elizabeth Shriver, Jersey City, NJ (US); Jeffrey S. Vitter, Durham, NC (US)

(73) Assignee: Lucent Technologies, Inc., NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,110

(22) Filed: Jul. 2, 1998

(51) Int. Cl.[7] .................................................. G06F 12/00

(52) U.S. Cl. ............................................ 711/113; 711/171

(58) Field of Search ................................ 711/113, 120, 711/204, 209, 213, 169, 127, 157, 114, 112, 171; 712/207

(56) References Cited

U.S. PATENT DOCUMENTS

| | | | |
|---|---|---|---|
| 4,428,064 | * 1/1984 | Hempy et al. | 711/113 |
| 5,185,878 | * 2/1993 | Baror et al. | 711/123 |
| 5,493,668 | * 2/1996 | Elko et al. | 711/130 |
| 5,822,790 | * 10/1998 | Mehrotra | 711/213 |

OTHER PUBLICATIONS

Arunachalam, M., Choudhary, A., and Rullman, B. "A prefetching prototype for the parallel file system on the Paragon." *Proceedings of ACM SIGMETRICS Conference on Measurement and Modeling of Computer Systems* (Ottawa, Canada), pp 321–323, May 1995.

Barve, R.D., Grove. E.F., and Vitter, J.S. Simple randomized mergesort on parallel disks. *Parallel Computing*, 23(4):601–631. North–Holland (Elsevier Scientific) Jun. 1997.

Bitton, D., and Gray, J. "Disk Shadowing" *Proceedings of the 14th International Conference on Very Large Data Bases* (Los Angeles, CA), pp. 331–338, 1988.

Cao, P., Felten, E.W., Karlin, A.R. and Li, K. Implementation and performance of integrated application–controlled caching, prefetching and disk scheduling. *ACM Transaction of Computer Systems* (*TOCS*) ACM Press, Nov. 1996.

Cormen, T.H. and Hirschl. M. Early experiences in evaluation the Parallel Disk Model witht he ViC* implementaion. *Parallel Computing*, 23(4):571–600. North–Holland (Elsevier Scientific) Jun. 1997.

(List continued on next page.)

Primary Examiner—Matthew Kim
Assistant Examiner—Matthew D. Anderson
(74) Attorney, Agent, or Firm—Sofer & Haroun, LLP (57) ABSTRACT

A method for scheduling access of data blocks located in a computer system having a plurality of disk drives, each disk drive has a disk cache with a specified fence parameter value coupled to a host computer via a common bus. The method according to one embodiment, comprises the steps of: (a) sequentially accessing each of the disk drives for a predetermined number of iterations to retrieve a predetermined number of data blocks; (b) for a specified number of the iterations, transferring data located in the disk cache to be transferred to the common bus and requesting data corresponding to the following iteration to be transferred to the disk cache; and (c) repeating steps (a) and (b) until the predetermined iterations are completed.

6 Claims, 3 Drawing Sheets

OTHER PUBLICATIONS

Hennessy, J.L. and Patterson D.A. Computer architecture: a quantitative approach. Morgan Kaufmann Publishers, Incorporated, San Francisco, CA, 1996, 2nd Ed.

Kimbrel, et al. A trace–driven comparison of algorithms for parallel prefetching and caching. *Proceedings of the 1996 Symposium on Operationg Systems Design and Implementation* (Seattle, WA), pp 19–34, USENIX Association, Oct. 1996.

Mowry, Denke and Krieger. Automatic compiler–inserted I/O prefetching for out–of–core applications. *Proceedings of the 1996 Symposium on Operations Systems Design and Implementation* (Seattle, WA), pp 3–17, USENIX Association, Oct. 1996.

Elizabeth Shriver, 1997. "Performance modeling for realistic storage devices" PhD thesis, Department of Computer Science, New York University, New York, NY.

* cited by examiner

SYSTEM AND METHOD FOR MODELING AND OPTIMIZING I/O THROUGHPUT OF MULTIPLE DISKS ON A BUS

CROSS-REFERENCE TO RELATED APPLICATIONS

This patent application is related to U.S. Pat. No. 6,260,108 09/110,114, invention and entitled "A System and Method for Modeling and Optimizing I/O Throughput of Multiple Disks on a Bus."

FIELD OF THE INVENTION

This invention relates to data transfer arrangements in multiple disk systems and specifically to a system and method for optimizing data throughput in an input/output (I/O) bus coupled to a plurality of disk drives.

BACKGROUND OF THE INVENTION

In the past decade, computer systems have enjoyed a hundred-fold increase in processor speed, while the speed of disk drives has increased by less than a factor of 10. As a consequence of this disparity, computer systems that run applications that perform I/O-intensive processing, are designed to use many disks in parallel, usually organized as a disk farm or a RAID array. The physical organization generally consists of one or more I/O buses, (e.g., SCSI, FC, or SSA) with several disks on each bus.

Previous work related to disk I/O performance has focused on the disk drive, down playing the importance of bus contention and other bus effects. Indeed, the bus effects play an insignificant role in I/O performance for workloads with small I/O request sizes. But many I/O-intensive applications benefit significantly from larger requests (8–128 KB). Among these are multimedia servers and certain database and scientific computing applications that use external memory and out-of-core algorithmic techniques to process massive data sets. In such applications, parallel I/O performance is often limited by the bus.

Some prior art systems have attempted to implement a model of a computer system that retrieves data from a plurality of disk drives that are coupled to a bus, for example, a bus that employs a Small Computer System Interface (SCSI) protocol. Others have presented detailed performance studies for single disk systems, and approximation techniques for multiple disk systems. For several important workloads, the previous disk models fail to give an accurate prediction of system performance.

Thus there is a need for a system and a method for obtaining an analytical model of a bus supporting multiple disks, and based on that model, implementing a system that is configured to optimize the data throughput traveling via that bus.

SUMMARY OF THE INVENTION

In accordance with one embodiment of the invention, a computer system accesses data located in a plurality of disk drives coupled to a disk bus having a predetermined bus bandwidth. Each disk drive includes a buffer or cache memory for storing data intended to be transferred via the bus or onto the disk surface. The data from the disk are stored in the cache memory at a disk rotational bandwidth, and the data from cache to the disk bus are transferred at the bus bandwidth. During each read iteration, each disk drive loads its disk cache with the next request's data while the bus is being used by other disk drives to transfer the data for the current requests. Thus, each disk drive retrieves the data for the following read iteration from each disk to the corresponding disk cache, while data for the current read iteration is being provided from each disk cache to the disk bus.

In accordance with another embodiment of the invention, during each read iteration, each drive loads its disk cache with the data in the disk sector located before the sector that contains the data required for the next request. Thus, each disk drive retrieves the data for the following read iteration from each disk to the corresponding disk cache using a disk pre-fetch feature while data for the current read iteration is being provided from each disk cache to the disk bus.

In accordance with another embodiment of the invention, a computer system includes a plurality of disk drives each disk drive having a disk cache with a zero fence parameter value coupled to a host computer via a common bus, a read duration estimator for measuring the average time to read data blocks in each one of the disk drives comprises an overhead unit configured to provide the time during which a request is created and sent from a host computer to a disk drive via the bus. A minimum positioning time estimator is also included and is configured to measure the shortest time required for a disk drive to locate the data block. A mechanism-to-cache read time estimator is included and is configured to measure the time required for a leading portion of a requested data block to be transferred to a disk cache with the minimum positioning time. A data block read time estimator is configured to measure the time required to transfer data blocks remaining after transmitting to the host a corresponding leading portion of a requested data block in each of the disk caches. An adder is coupled to the overhead unit, the minimum positioning time estimator, the mechanism-to-cache read time estimator, and the data block read time estimator to provide an estimated duration for data request.

It is noted that in accordance with another embodiment of the invention, the read duration estimator employs a disk drive with a non-zero fence parameter. Thus, a computer system in accordance with this embodiment comprises an overhead unit configured to provide the time during which a request is created and sent from a host computer to a disk drive via the bus. A minimum positioning time estimator is configured to measure an expected minimum positioning time corresponding to the shortest time required for a disk drive to locate the requested data block. A mechanism-to-cache read time estimator is configured to provide the time required for a disk drive to transfer a data portion to a disk cache. A data block read time estimator is configured to measure the time required to transfer data blocks stored in each of the disk caches to the host. An adder is coupled to the overhead unit, the minimum positioning time estimator, the mechanism-to-cache read time estimator, and the data block read time estimator to provide an estimated duration for a data request.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1:
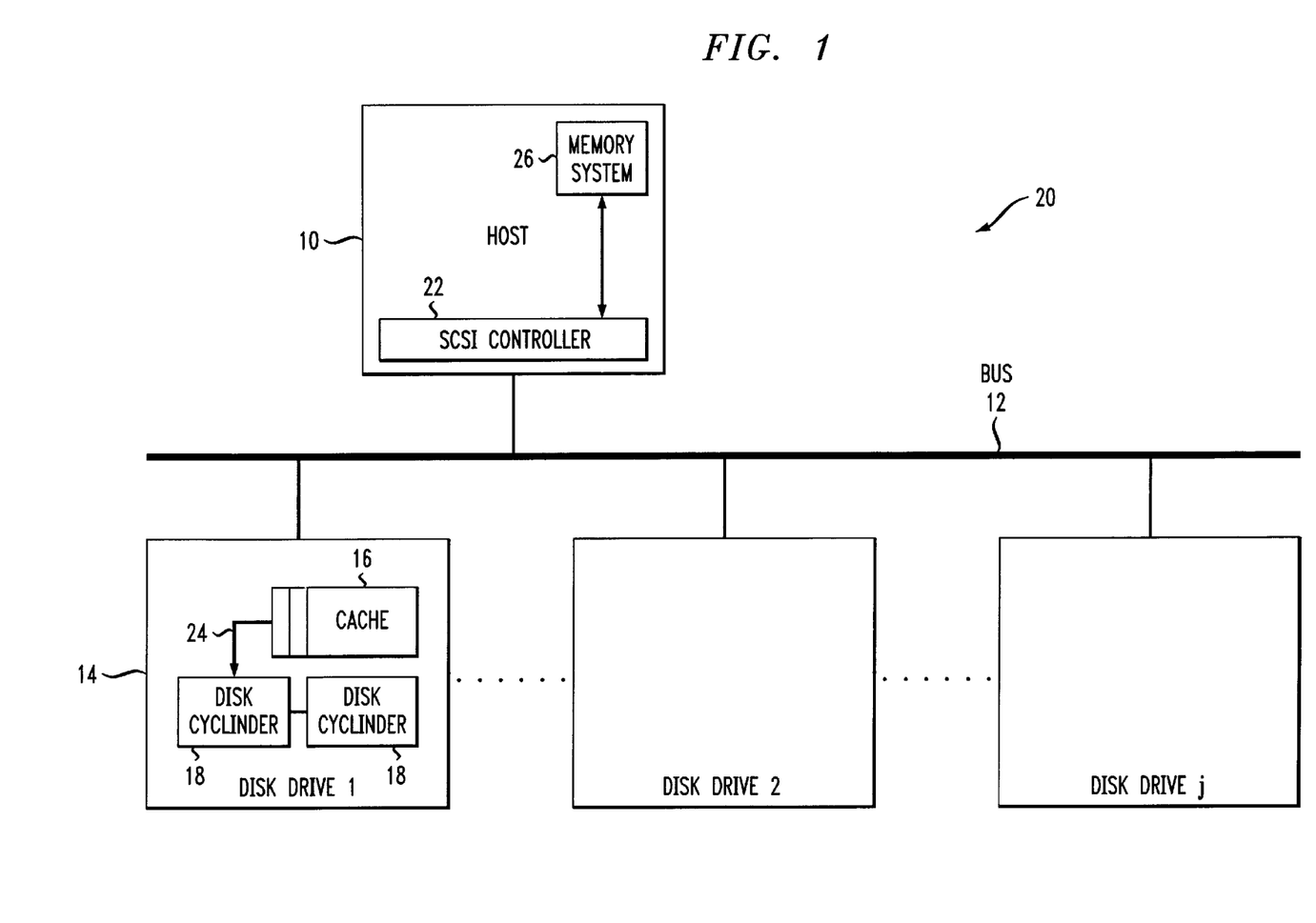
FIG. 1 is a block diagram of a computer system that employs a method for optimizing data throughput in accordance with one embodiment of the present invention.

FIG. 1 illustrates a hardware configuration of a computer system 20 in accordance with one embodiment of the invention. A host computer 10 is configured to retrieve data from a plurality of disk drives 14 via a disk bus 12. In accordance with one embodiment of the invention, disk drives 14 may be a currently available disk drive such as Seagate Cheetah® model ST-34501W, connected to a computer 10, such as Sun Ultra-1® running Solaris 2.5.2 operating system, or, Seagate Barracuda® model ST-32171W, connected to a DEC AlphaStation® computer running a Digital Unix 4.0 operating system. It is noted that although the embodiments described herein refer to disk drives connected to a bus, the principles of the present invention apply to other data devices connected to the bus, such as tape drives. Furthermore, a combination of disk drives and tape drives may be coupled to a bus.

In accordance with one embodiment of the invention, bus 12 employs a communications protocol known as the small computer system interface (SCSI) protocol. To this end, each disk drive 14 includes a unique SCSI identifier which determines the priority of the disk drive when multiples disk drives are coupled to bus 12. Computer 10 also includes a SCSI controller 22, which has the highest priority. Thus, controller 22 prevails in any contention in which it participates. A memory system 26 is coupled to controller 22, and is configured to receive and store the data that has been retrieved from disk drives 14.

Each disk drive 14 includes a data cache 16 which is configured to act as a data buffer for transferring disk data to bus 12. Disk drive 14 also includes a plurality of disk platters 18 that contain a predetermined volume of data. Each platter includes a plurality of tracks that in turn contain a plurality of data sectors per track. Each data sector contains a predetermined length of data, such as 512 bytes. A plurality of disk heads 24 are controlled by a disk controller to be positioned to an appropriate location of a platter 18 in response to a request received by disk drive 14. It is noted that typically the disk platters are positioned on top of each other, spaced apart at a predetermined distance, and, are rotated around a vertical central axle. The tracks from each platter disposed at an equal distance from the axle, form a cylinder referred to as disk cylinder.

Data is transferred from cache 16 to host 10 in accordance with a control arrangement referred to as fence parameter. The fence parameter determines the time at which a disk drive 14 will begin to contend for the SCSI bus. The fence is also called the buffer full ratio in accordance with SCSI protocol as described on the SCSI-2 disconnect/reconnect control mode page. When a disk drive 14 is instructed to perform a read, and the disk recognizes that there will be a significant delay, such as the time it takes for head 24 to locate the appropriate data, the disk releases control of the SCSI bus (it disconnects). When disk drive 14 is ready to transfer the data to host 10, it contends for control of SCSI bus 12 (it reconnects) so that the read can be completed.

Thus, the time that the bus receives a request to transfer data from a disk drive to the host is mainly based on the value of the fence parameter.

If the fence parameter is set to the minimum value, it will contend for bus 12 after the first sector of data has been transferred from a disk platter 18 to disk cache 16. By contrast, if the fence parameter is set to the maximum value, it will wait until almost all of the requested data has accumulated in the disk cache before contending for the bus. The performance implication is as follows. A low fence setting tends to reduce the response time, because the disk attempts to send data to the host as soon as the first sector is available. But when the cached data has been sent to the host (at the bus bandwidth), the disk continues to hold the bus. The remainder of the transfer occurs at a bandwidth referred to as rotational bandwidth, which is the rate at which bits pass under the disk head. The rotational bandwidth is usually less than 25% of the bus bandwidth, and for some disks, far less. A high fence parameter setting causes the disk to delay the start of data transfer to the host, but when the transfer does occur, it proceeds at "bus bandwidth", from cache 16 on the disk drive into host controller 22. In systems with multiple disks on a bus, a high fence setting potentially increases overall throughput for I/O intensive workloads.

In accordance with one embodiment of the invention, a performance model for a system that employs a disk drive configuration in accordance with FIG. 1 can be obtained. This model preferably approximates the time to complete a read operation in response to a request for a predetermined length of data referred to as a data block located on a disk drive 14.

The significant components of the time to complete a read operation are as follows.

Host queue time: The time during which a request remains queued up in SCSI controller 22.

Overhead: The time necessary to create a request and send the request from host 10 to a disk drive 14.

Device queue time: The time that a request waits in a disk drive 14 while a previous request is being served. This time is zero for a drive that can only handle one request at a time.

Seek time: The time required by disk head 14 to move to the track containing a requested data block address. Seek time has a nonlinear dependency on the number of tracks to be traversed.

Rotational latency time: After a seek completes, the time during which the disk rotates to position the disk head at the start of the data block.

Rotational transfer time: After the rotational latency completes, the time required for the head to transfer data from the disk platter 18 to cache 16. This time is largely governed by the speed of rotation and the number of bytes per track. This time is proportional to the number of bytes transferred, and includes any additional time required for track switches and cylinder switches when an I/O extends across multiple tracks or cylinders.

Bus busy time: The time period during which (some or all of) the data block resides in cache 16, waiting for bus 12 to become available for a transfer to host 10.

Bus transfer time: The time required to transmit a data block over bus 12, at the sustained bus bandwidth, from a disk drive 14 to host 10. It is proportional to the number of bytes to be transferred.

It is noted that the service time for a disk request is not simply the sum of these components. For instance, if the fence parameter is 0, some of the rotational transfer time may be overlapped with the bus transfer time. Moreover, under different scenarios, different terms may dominate. If many disks share a bus, the overlapped I/O transfers may cause the bus busy time to dominate, leading to service times much larger than the bus transfer time. If the I/O requests are small, then the overhead may dominate, in which case the effective data rate on the bus cannot approach the bus bandwidth, even if many disks share the bus.

In accordance with one embodiment of the invention, several simulated workloads may be performed to obtain and verify a model corresponding to the behavior of system 20. Throughout these simulations it is assumed that at most one request per disk is outstanding so that both the host queue time and the device queue time are zero. It is noted that the exemplary workloads described herein are for purposes of illustration only, and other workloads may also be employed in accordance with other embodiments of the invention.

An example of a simulated workload includes a process which consists of random, fixed-sized reads. Another simulated workload process may consist of random reads where the requested data size is uniformly distributed. A third simulated workload may consist of fixed-sized reads uniformly distributed on a subset of the cylinders of the disks; these workloads are referred to as having "spatial locality." These workloads capture the access patterns of external-memory algorithms designed for the Parallel Disk Model as described in Jeffery S. Vitter and Elizabeth A. M. Shriver, *Algorithms For Parallel Memory I: Two-Level Memories,* 12 (2/3) Algorithmica 110–47 (August and September 1994), and incorporated herein by reference. Examples of such algorithms are merge sort as described in Rakesh D. Barve, Edward F. Grove, and Jeffrey S. Vitter, *Simple Randomized Merge sort On Parallel Disks,* 23(4) Parallel Computing 601–631. North-Holland (Elsevier Scientific 1997) and incorporated herein by reference. Another example includes matrix multiplication as described in *Algorithms For Parallel Memory I: Two-Level Memories Id.*

In Parallel Disk Model algorithms, reads and writes are concurrent requests to a set of disks, issued in lock-step, one request per disk. The above described workloads also model applications that use balanced collective I/O's, i.e., where all processes make a single joint I/O request rather than numerous independent requests. The workloads also can be used to model a video-on-demand server that stripes data across multiple disks.

Preferably, in each workload, the requests are directed to a collection of independent disk drives 14 that share a bus 12. The requests are generated by multiple processes of equal priority running concurrently on a uniprocessor, one process per disk. Each process executes a tight loop that generates a random block address on its corresponding disk drive. The process then takes a time stamp corresponding to the time the request for a data block is made. Thereafter, the process issues a seek and a read system call to the raw disk (bypassing the file system). Thereafter, the process takes another time stamp corresponding to the time when the read request completes.

In accordance with one embodiment of the invention, each of the simulated workloads mentioned above consists of three phases: a startup period during which requests are issued but not timed, a measurement period during which the timings are accumulated in tables in main memory system 26, and a cool down period during which requests continue to be issued. The purpose of the startup and cool down periods is to ensure that the I/O system is under fill load during the measurements. The I/O systems provide fairness in all our experiments: each disk complete approximately the same number of I/O's as explained below in more detail.

Based on the workloads described above, the behavior of system 20 exhibits what is referred to as a "round behavior." A round defines a periodic convoy behavior wherein all disk drives 14 receive a read request from host 10, in response to which each disk drive transmits the requested data block to the host before any disk drive receives another read request.

Remarkably, the round behavior described above is contrary to expectation. Since host 10 has the highest priority, it is expected that soon after a disk drive completes one request, the host would seize the bus to send another request to that disk drive, thereby keeping the bus and all the disk drives busy. It is noted that rounds could arise if the operating system kernel implements a fairness policy that forcibly balances the number of requests sent to each disk during periods of heavy I/O load by issuing requests in batches, instead of sending requests to disks as soon as possible.

In accordance with one embodiment of the invention, in order to ascertain whether D number of disk drives are served in accordance with a round behavior under some workload, it is preferable to examine the ordered I/O completion time stamps using a sliding window of size D. A violation of round ordering is said to occur on the jth time stamp in the window (where $0 \leq j \leq D-1$) if there is an i<j such that the ith and jth I/O of the window both originate from the same disk: if the current sliding window contains a violation at the jth position, the window is advanced by j positions. Otherwise it is advanced by D positions. The fraction of I/O operations that do not violate round ordering is a measure of the extent of round formation for that experiment. In simulations described above, rounds occurred 88–99% of the time for uniform random workloads containing a mixture of 1, 2, 3, or 4 different request sizes and for workloads that have spatial locality. The workloads that were experimented with have request sizes of B . . . iB, for i the number of request sizes in the workload and for B=8,16,32,64, or 128 KBs.

It is noted that if the request size is small, system 20 does not exhibit a round behavior. In this case, bus 12 does not experience a bottleneck.

In accordance with one embodiment of the invention, a read duration model for reading data is provided as described hereinafter. The read duration is defined as the time period between a time stamp immediately before a read operation is made and immediately after the data is returned to the host.

The read duration model is described for a system 20 which includes only one disk drive 14, with a fence parameter value of zero and a non-zero fence parameter. The read duration model is also described for a system 20 having a plurality of disk drives 14 with zero and non-zero fence parameters.

Single Disk Model

In accordance with one embodiment of the invention, a model that characterizes read duration when only a single disk drive is active is described hereinafter. The model derived based on the principles of the present invention applies to both zero and non-zero fence parameter values. This model allows a system designer to estimate the performance of a system that utilizes disk drives, such as disk drive 14 of FIG. 1 for retrieving and storing data from a host computer 10, via a bus 12. Although, the examples provided herein relate to a SCSI bus, it will be appreciated that the invention is not limited in scope in that respect and other types of bus protocols may be employed.

Read Duration for Fence Value 0.

When the fence parameter value of a disk drive 14 is zero, the disk drive requests the bus as soon as the first sector is available in disk cache 16. After the first sector has been transferred to the host, the transfer of the remainder of the data occurs at a mechanism-to-cache rate bandwidth referred to as rotational bandwidth (bandwidth rot) which corresponds to the rotational transfer time. As described above, the rotational transfer time is the time required for head 24 to transfer data from disk platter 18 to disk cache 16. It is noted that the rotational bandwidth is smaller than the cache-to-host rate, bandwidth referred to as the bus bandwidth (bandwidth$_{bus}$).

When using only a single disk, and the data block does not cross a track or cylinder boundary, the average time to read a data block of size B (B>>1 sector) is well approximated by $$ReadDuration = \qquad (1)$$
$$Overhead + E[SeekTime] + E[RotationalLatency] + \frac{B}{bandwidth_{rot}}$$

wherein, overhead time is the time required by the bus protocol to send a request from a controller 22 to disk drive 14, and E[Seek Time] is the expected value of the time required by disk head 24 to move to the track containing a requested data block address, and E[Rotational Latency] is the expected time after a seek completes during which the disk platter rotates to position disk head 24 at the start of the data block, and B is the data block size.

Equation (1) approximates the average read duration as the sum of the bus protocol overhead time, the expected seek time, the expected rotational latency, and the time to read the data from the disk surface. The data is transferred over the bus at the rotational transfer rate. This follows because disk cache 16 is used as a speed matching buffer.

When B is large, the requested data will extend over a number of tracks and possibly cylinders. Thus, the track and cylinder switch times must be taken into account as well. These switching times are respectively referred to as Track-SwitchTime and CylinderSwitchTime, which correspond to the amount of time to perform one track switch and one cylinder switch, respectively. The number of cylinder switches may be approximated by B/AverageCylinderSize, and the number of track switches (including those that also cross a cylinder boundary) by B/AverageTrackSize. Thus, the sum of the track and cylinder switch times, referred to as TrackCylinderSwitch Time may be defined as $$TrackSwitchTime\left(\frac{B}{AverageTrackSize} - \frac{B}{AverageCylinderSize}\right) + \qquad (2)$$
$$CylinderSwitchTime \cdot \frac{B}{AverageCylinderSize}$$

Using the above definition of TrackCylinderSwitch Time, the following expression for the average read duration is defined by $$ReadDuration = Overhead + E[SeekTime] + \qquad (3)$$
$$E[RotationalLatency] + \frac{B}{bandwidth_{rot}} + TrackCylinderSwitchTime$$

Figure 2:
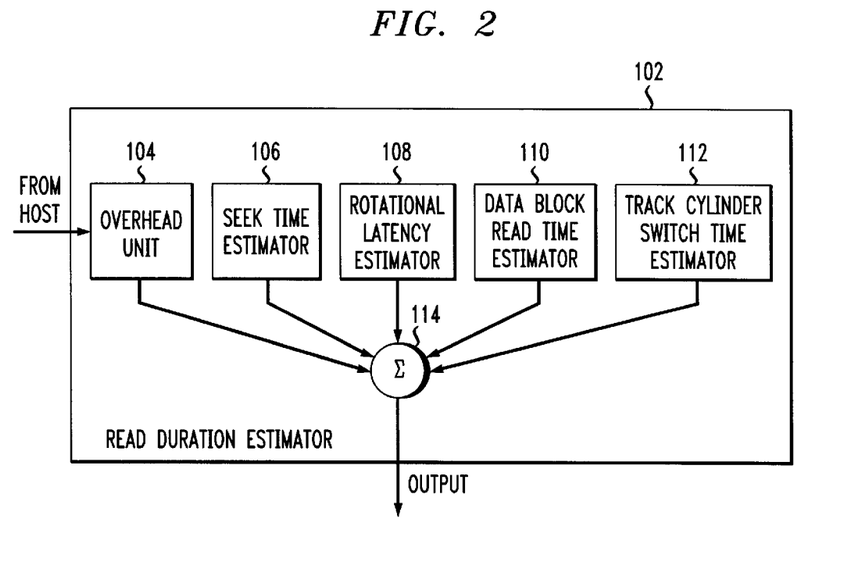
FIG. 2 is a block diagram of a read duration estimator in accordance with one embodiment of the present invention.

FIG. 2 illustrates a read duration time estimator 102 that is employed to measure the read duration time for a computer system 20 that employs one disk drive such as 14, in accordance with one embodiment of the invention. As illustrated, overhead unit 104 is configured to provide the bus overhead time depending, among other things, on the bus protocol being employed, the host characteristics, the operating system employed by the host, the host controller, and the disk controller. Seek time estimator 106 calculates the average time required by disk head 14 to move to the track containing a requested data block. Rotational latency estimator 108 is configured to calculate the average time after the seek is complete during which the disk platter rotates to position disk head 24 at the start of a data block. Data block read time estimator 110 is configured to calculate the time to read data from disk platter 18. Finally, TrackCylinderSwitchTime estimator 112 measures the sum of the track and cylinder switch times, when a data block crosses track and cylinder boundaries. The output of units 104, 106, 108, 110 and 112 are provided to a summing unit 114 so as to provide the read duration time for system 20 as described above.

Read Duration for Non-zero Fence Value.

When the fence parameter value of disk drive 14 is set to a non-zero value, a fraction of the requested data is first read into the disk drive's cache before the bus is requested. Data is transferred first from disk platter 18 into disk cache 16 at the rate of rotational bandwidth (bandwidth$_{rot}$) as explained above, and then over bus 12 at the cache-to-host rate or bus bandwidth (bandwidth$_{bus}$).

When the data is going over the bus to the host, either the rest of mechanism-to-cache data transfer will be hidden by the cache-to-host transfer, i.e., the transfer time is B−B$_c$/bandwidth$_{rot}$, or, the cache-to-host transfer will be visible, i.e., the transfer time is B/bandwidth$_{bus}$. It is noted that the number of bytes in the disk cache before the bus is requested, is denoted as B$_c$. Preferably, B$_c$=B. (Fence value/256), wherein B is the data block size and the maximum fence parameter value is 255 sectors. As mentioned above, when the fence parameter value is 255, the disk waits until 255/256 of the requested number of sectors are in disk cache, before the disk drive contends for bus 12.

When using only a single disk, the average time to read a data block of size B that does not span across multiple tracks or cylinders is $$ReadDuration = Overhead + E[SeekTime] + E[RotationalLatency] + \qquad (4)$$
$$\frac{B_c}{bandwidth_{rot}} + \max\left(\frac{B}{bandwidth_{bus}}, \frac{B-B_c}{bandwidth_{rot}}\right)$$

Taking into account the time for the cylinder and track crossings, the read duration time is $$ReadDuration = \qquad (5)$$
$$Overhead + E[SeekTime] + E[RotationalLatency] + \frac{B_c}{bandwidth_{rot}} +$$

-continued $$TrackCylinderSwitchTime + \max\left(\frac{B}{bandwidth_{bus}}, \frac{B - B_c}{bandwidth_{rot}}\right).$$

It is noted that the models presented in equations (3) and (5) may be extended to multiple request sizes by providing a weighted average of the read durations for each request size. Similarly, when the workload requests are not distributed across the entire disk, but instead are confined to a contiguous subset of the disk platters, the expected seek time used in equations (3) and (5) is calculated over that number of cylinders.

Parallel Disk Model

As explained above, when system 20 employs a plurality of disk drives 14 coupled to a bus 12 the input/output (I/O) transactions with the disk drives form a round behavior. In each round, one request is served from each disk. When the fence parameter value is 0, a disk is ready to transfer data to the host after it has positioned its head to the data and read the first sector into its disk cache. This time is dominated by the positioning time, which greatly exceeds the rotational transfer time for one sector. Transmission of data to the host begins when any one of the disks is ready, so on a bus with D disks, the idle time on the bus at the beginning of a round is well approximated by the expected minimum positioning time, denoted MPT(D).

Parallel Read Duration for Fence Value 0.

The general scenario in a round in accordance with the present invention is as follows. One request is sent to each of D disks 14. Usually the requested data blocks are not in disk caches 16, so the drives disconnect from bus 12. The disk with the smallest of the D positioning times reads the first requested sector into its cache, and reconnects to the host. It transmits the first sector at the bus bandwidth (bandwidth$_{bus}$), and then continues transmitting at rotational bandwidth (bandwidth$_{rot}$). After sending some data to the host, the disk disconnects, either because it has transferred the entire data block, or because the remaining portion of the data block lies on the next track or cylinder. By the time this disconnection occurs, it is likely that other drives have read enough data into their disk caches that the remaining portion of the D data blocks can be sent to the host at bus bandwidth (bandwidth$_{bus}$). There may be several disconnects during this transmission, as various drives reach track or cylinder boundaries, but as soon as one drive disconnects, another reconnects to continue sending data to the host.

The average size of the leading portion of the first data block (i.e. the amount transferred prior to the first disconnection) is referred to as Leading_Portion(B). However, although the first disk sends one sector at the rate of bus bandwidth (bandwidth$_{bus}$), before sending more at the rotational bandwidth (bandwidth$_{rot}$), it is assumed that the entire leading portion from the first disk is sent at the rotational bandwidth. Furthermore, the overhead of the disconnection and reconnection is sufficiently small that it is absorbed into the overhead term. Thus, in accordance with one embodiment of the invention, the average read duration is given by $$ReadDuration = Overhead + MPT(D) + \qquad (6)$$

$$\frac{Leading\_Portion(B)}{bandwidth_{rot}} + \frac{DB - Leading\_Portion(B)}{bandwidth_{bus}}$$

wherein overhead is the time required for the bus to send a request from controller 22 to disk drive 14 in accordance with the bus protocol, and MPT(D) is the minimum positioning time of head 24 at the start of the requested data block.

When the request size B is small, it is usual for the entire data block to reside on a single track, whereas for large request sizes the expected size of the leading portion is one half the track size. Thus if $B \leq AverageTrackSize/2$, advantageously, Leading_Portion(B) is approximated as Leading_Portion(B)=B, otherwise it is approximated as Leading_Portion(B)=AverageTrackSize/2.

It is noted that equation (6) does not contain terms to account for the track and cylinder crossings such as those contained in equations (3) and (5). These crossings do not add to the read duration because the bus remains busy: one disk disconnects and another disk immediately seizes the bus to send its data to the host.

Parallel Read Duration for Non-zero Fence Value.

In this case, the bus is idle during the shortest positioning time, then the bus continues to remain idle while the disk with shortest positioning time reads $B_c = B \cdot (FenceValue/256)$ bytes of the B bytes into its cache 16. Next the bus transmits those bytes to the host, followed by the rest of the data block and the data blocks from the other D−1 disks. Thus the average read duration in this case is given by $$ReadDuration = \qquad (7)$$

$$Overhead + MPT(D) + \frac{B_c}{bandwidth_{rot}} + \frac{DB}{bandwidth_{bus}}.$$

Figure 3:
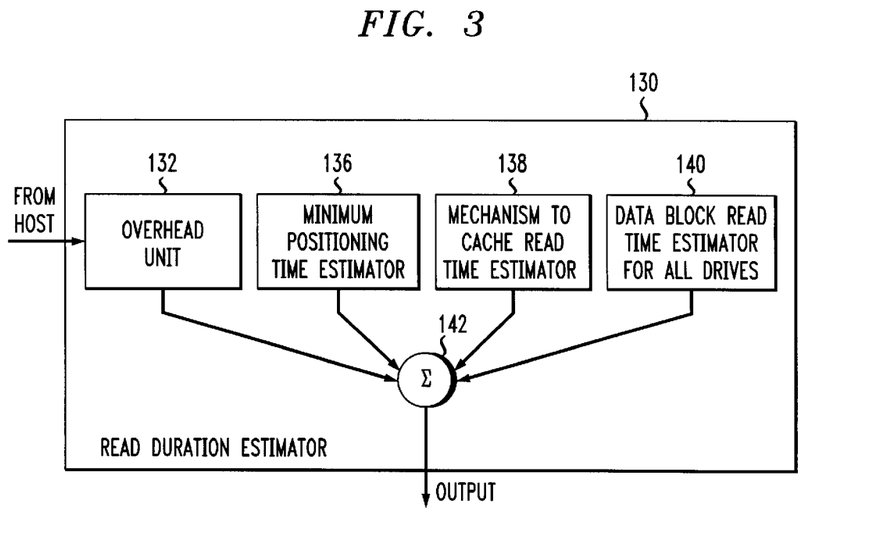
FIG. 3 is a block diagram of a read duration estimator in accordance with another embodiment of the present invention.

FIG. 3 illustrates a read duration time estimator 130 that is employed to measure the read duration time for a computer system 20 that employs a plurality of D disk drives such as 14, with a non-zero fence parameter value in accordance with one embodiment of the invention. As illustrated, overhead unit 132 is configured to provide the bus overhead time depending on the bus protocol being employed. Minimum positioning time estimator 136 is configured to obtain the shortest time that it takes for one of the D disk drives to position its corresponding head 24 over the beginning of a requested data block contained in that disk drive. Mechanism-to-cache read time estimator 138 provides the time that is required for the disk with shortest positioning time to transfer data from the corresponding disk platter 18 to disk cache 16 in accordance with a specified fence parameter value. Finally, data block read time estimator for all disks 140, estimates the time that the remaining data blocks on all disk drives are transferred to host 10 via bus 12. The output of units 132,136,138 and 140 are provided to a summing unit 142 so as to provide the read duration time for system 20 as described above.

It is noted that the round behavior of system 20 does have an impact on the specified fence parameter values and on the data throughput in bus 12. For example, a higher fence parameter value would increase overall throughput if the time to read the $B_c$ bytes into the cache at each disk were fully overlapped with bus bandwidth transfers by other disks. Since the workload attempts to keep all disks busy, it is expected that a fully overlapped scenario would occur. However, due to round behavior of system 20, the fully overlapped scenario does not occur and the throughput is reduced. In particular, the first such read (as well as the corresponding positioning time) is not overlapped, so that in fact smaller fence values result in higher throughput, even with an aggressive workload.

In accordance with another embodiment of the invention, minimum positioning time estimator 136 provides an expected minimum positioning time as described hereinafter. This expected minimum positioning time may be advantageously obtained for a system consisting of D disk drives 14 where each disk receives a random request at approximately the same time. Let ST be the random variable denoting the seek time of one disk and let $MST_D$ be the random variable denoting the minimum seek time for a D-disk system. The expected minimum positioning time can be approximated as the sum of the expected minimum seek time and the mean rotational latency:

$$MPT(D)=MST_D+E[\text{RotationalLatency}] \quad (8)$$

The random variable $MST_D$ denoting the minimum seek time for a D-disk system is estimated as described hereinafter.

Since it is assumed that the D disks are independent and have identical seek curves $$Pr[MST_D \geq z]=(Pr[ST \geq z])^D \quad (9)$$

wherein Pr $[X \geq x]$ is the probability that the random variable X is greater or equal to x.

The number of cylinders that the disk head can move past during time x is denoted as cylinder[x]; this is formally defined as $$\text{cylinder}[x] = \left(\frac{x-a^2}{b}\right) a < x < SeekTime[e] \quad (10)$$

$$\text{cylinder}[x] = \left(\frac{x-c}{d}\right) SeekTime[e] \leq x < SeekTime[MaxCylinder]$$

where the seek curve of the disk is defined as $$SeekTime[dis]=0 dis=0$$

$$SeekTime[dis]=a+b\sqrt{dis} 0 \leq dis \leq e$$

$$SeekTime[dis]=c+d \cdot dis\ dis>e \quad (11)$$

where a, b, c, d, and e are device-specific parameters and dis is the number of cylinders to be traveled. Using equation (4.5) from Elizabeth Shriver *Performance modeling for realistic storage devices* PhD thesis, Department of Computer Science, New York University, New York, N.Y., May 1997, and incorporated herein by reference, and equation (9), $$Pr[MST_D \geq Z] = \left(1 - \frac{\text{cylinder}[z]}{MaxCylinder}\right)^{2D} \quad (12)$$

wherein MaxCylinder is maximum number of cylinders on the disk.

Using the definition of expectation for a finite continuous real random variable and equation (12), $$E[MST_D \geq z] = \quad (13)$$

$$\int_0^\infty Pr[MST_D \geq z]\,dz = \int_0^\infty \left(1 - \frac{\text{cylinder}[z]}{MaxCylinder}\right)^{2D} dz$$

Assuming the three-part seek curve as presented in equation (11), equation (13) can be simplified to $$a+b\sqrt{MaxCylinder} \cdot \sum_{\substack{i=0 \\ 2D}}^{i=0} \binom{2D}{i}(-1)^i \frac{\sqrt{e/MaxCylinder}^{2i+1}}{2i+1} + \quad (14)$$

$$\frac{d \cdot MaxCylinder}{2D+1}\left(1 - \frac{e}{MaxCylinder}\right)^{2D+1}$$

It is noted that the round behavior of system 20 has an impact on fence parameter effects and data throughput in bus 12. For example, a higher fence parameter value would increase overall throughput if the time to read the $B_c$ bytes into the cache at each disk were fully overlapped with bus bandwidth transfers by other disks. Since the workload attempts to keep all disks busy, it would be expected that a fully overlapped scenario would occur. However, due to the round behavior, the fully overlapped scenario does not occur and the throughput is reduced. In particular, the first such read (as well as the corresponding positioning time) is not overlapped, so that in fact smaller fence values result in higher throughput, even with an aggressive workload.

Furthermore, similar to the single disk model explained above, the multiple disk model can be modified to support a workload that has requests which are randomly distributed across a subset of the cylinders, by adjusting the expected seek time approximation.

Figure 4:
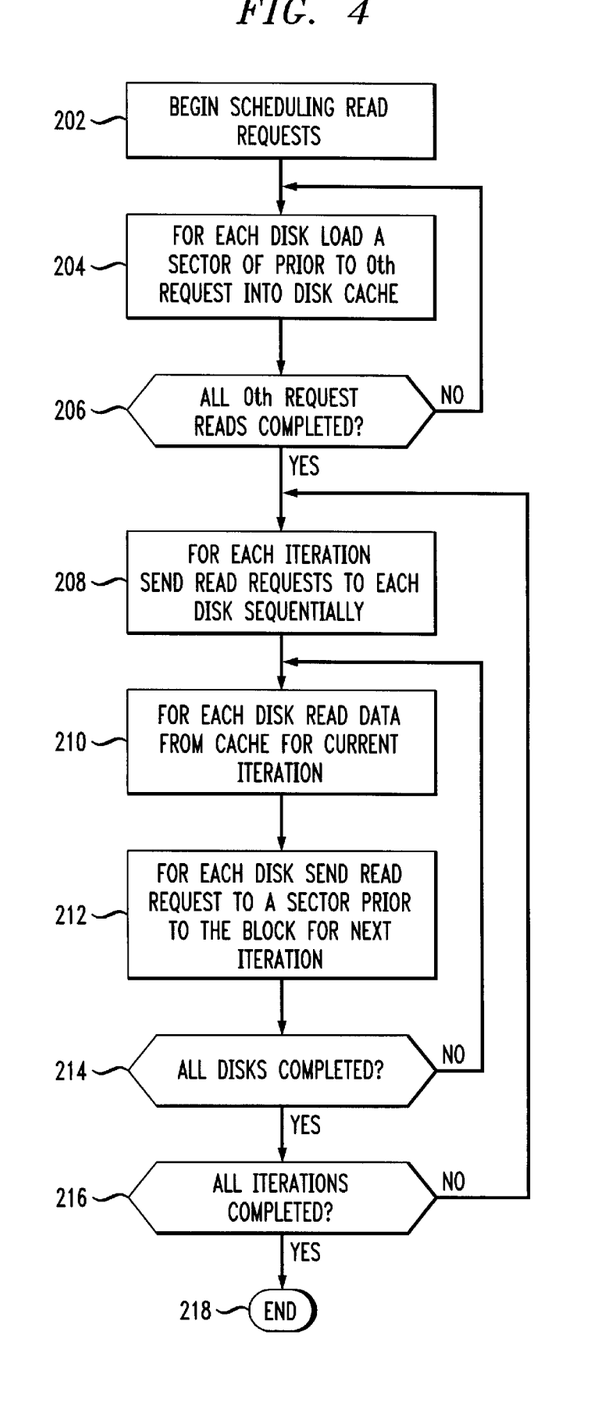
FIG. 4 is a flow diagram of a scheduling process for retrieving data from a plurality of disk drives in accordance with one embodiment of the invention.

FIG. 4 is a flow chart of a bus scheduling process in accordance with one embodiment of the present invention. In accordance with one embodiment of the invention, the model equations (6) and (7) suggest two ways to decrease the read duration. Thus, it is possible to decrease the minimum positioning time, and convert those transfers that occur at the rotational bandwidth (bandwidth$_{rot}$) to the faster bus bandwidth (bandwidth$_{bus}$)

As illustrated in FIG. 4, the scheduling process for retrieving data blocks from a plurality of disk drives 14 is based on a sequential iteration of data requests. Thus, assuming that during iteration j-1, host 10 has knowledge of the data blocks that will be requested during iteration j, the scheduling or pipelining technique in accordance with the present invention is to overlap the positioning time for iteration j with the transfer time of the previous iteration. Furthermore, this pipelining technique stages data in disk caches 16, so that the first data block transmitted during iteration j is sent from cache at the bus bandwidth (bandwidth$_{bus}$), rather than from the disk platter at the rotational bandwidth (bandwidth$_{rot}$).

At step 202 host 10 begins scheduling read requests. At step 204, for each $b_{ij}$ denoting the data block to be retrieved from disk i in round j, host 10 schedules bus 12 so that for all the D disks data blocks corresponding to the 0th iteration is transferred to the corresponding disk cache 16.

At step 208, during each iteration j, host 10 sends a read request to the D disk drives 14. At step 212 host 10 also sends to each disk drive a read request for the block that is required during the following iteration. As a result, while a disk drive is fetching the data for a following request, data from its disk cache and other disk caches are being transferred to host 10 via bus 12. A pseudo code describing the pipelining technique that schedules a SCSI bus in accordance with one embodiment of the present invention is as follows:

for $0 \leq i \leq D-1$

Request LoadIntoDiskBuffer ($b_{i,0}$) on disk $i$ for $0 \leq i \leq$ NumRequests     for $0 \leq i \leq D-1$         Read ($b_{ij}$) from disk $i$.

Request LoadIntoDiskBuffer ($b_{ij+1}$) on disk $i$.

The pseudo code LoadIntoDiskBuffer (b), causes the disk to prefetch data block b into its cache so that a subsequent Read(b) will not incur disk head positioning time or a head-limited transfer rate. The prefetch occurs while the bus is busy transmitting data blocks from other disks and from the previous round. Thus, the random access latency is overlapped with bus transfers, and the bus transfers occur at the higher cache data rate, rather than the slower disk-head rate. The result is fair parallel I/O in rounds, with a high aggregate bandwidth for random I/O. It is noted that in accordance with another embodiment of the invention, instead of performing a prefetch for each iteration, the system may, for a specified number of iterations, transfer data located in the disk cache and request data corresponding to the following iteration to be transferred to the disk cache.

In accordance with another embodiment of the invention, the command LoadIntoDiskBuffer (b) is implemented by an asynchronous or a non-blocking read transfer of a disk sector that is located just before the data block b that is intended to be read during a following iteration. This non-blocking read command denoted as aioread( ) triggers the corresponding disk drive and its related mechanism to load data block b into the disk cache. For each data block, the aioread( ) implementation incurs the overhead of sending an extra bus request to the disk and receiving the unwanted sector by host 10 that triggers the disk read ahead.

For disk drives that employ a SCSI bus protocol, a SCSI Prefetch implementation allows the prefetch of data blocks without the need to prefetch a sector just prior to the data block intended to be transferred. This prefetch implementation would only have the overhead of sending one extra SCSI request for each data block.

The results of experiments on several hardware configurations illustrate a performance gain from pipelining in accordance with the present invention despite the additional overhead of the aioread implementation of LoadIntoDiskBuffer.

Table 1 evaluates the effectiveness of the pipelining technique with 2, 3, and 4 Cheetah® disks on a Sun Ultra-1, transferred data blocks with sizes ranging from 8 KB to 128 KB. The measurements are averaged over 1000 I/Os. The table compares the aggregate transfer rate in MB/s achieved by the "naive" approach (one process per disk performing random I/Os) with the pipelined technique in accordance with the present invention. The column labeled "%" contains the relative improvement (in percent) of the pipelined technique. With small data block sizes, the overhead outweighs the improvement. With 2, 3 or 4 disks and moderate or large data block sizes, the overlaps gained by the pipeline technique more than compensate for the increased overhead. For example, with 4 disks and 96 KB data blocks, the bandwidth improves around 17%.

Furthermore, a scheduling process in accordance with the present invention that accesses across a collection of disks that share a bus may improve performance in the order of 20%. This is achieved by an application-level pipelining technique, which increases the aggregate disk bandwidth on the shared bus by increasing the overlap between disk seeks and data transfers, and by increasing the fraction of transfers that occur at the disk cache transfer rate rather than the slower disk head rate. The pipelining technique in accordance with the present invention enables each disk drive to be self-governing, such that it is not necessary to predict the positioning time that will be incurred by each I/O request. It is noted that if the workload does not have a uniform request size, the pipelining technique of the present invention, may be employed sometimes, for example, when a predetermined threshold for a request size has been reached.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

We claim:

1. In a computer system having a plurality of disk drives each disk drive having an internal disk cache with a specified fence parameter value coupled to a host computer via a common bus, a method for scheduling access of data blocks located in each one of said disk drives, said method comprising the steps of:

(a) accessing the disk drive having the shortest minimum positioning time among said plurality of disk drives for accessing a first data block;

(b) sequentially accessing each of said remaining disk drives for a predetermined number of data blocks;

(c) for a specified number of iterations, during a first iteration transferring data located in said internal disk cache to said common bus and requesting data corresponding to a following iteration to be transferred to said internal disk cache, in accordance with said specified fence parameters and based on information corresponding to data blocks that will be requested during said following iteration such that the size of the data transferred to said internal disk cache is equal to or smaller than the size of each of said data blocks; and (d) repeating steps (a), (b) and (c) until said specified number of iterations are completed.

2. The method in accordance with claim 1, wherein said step (b) comprises the steps of transferring data located in

TABLE 1

| Data Block | D = 2 | | | D = 3 | | | D = 4 | | |
|---|---|---|---|---|---|---|---|---|---|
| size (KB) | Naive | Pipeline | % | Naive | Pipeline | % | Naive | Pipeline | % |
| 8 | 1.32 | 1.22 | −8 | 1.97 | 1.74 | −12 | 2.63 | 2.30 | −13 |
| 16 | 2.48 | 2.34 | −6 | 3.65 | 3.31 | −9 | 4.83 | 4.28 | −11 |
| 32 | 4.43 | 4.27 | −4 | 6.32 | 6.07 | −4 | 8.02 | 7.75 | −3 |
| 64 | 7.08 | 7.09 | 0 | 9.38 | 10.05 | 7 | 10.72 | 12.48 | 16 |
| 96 | 8.76 | 9.48 | 8 | 10.85 | 12.76 | 18 | 12.09 | 14.12 | 17 |
| 128 | 9.86 | 11.01 | 12 | 11.79 | 14.19 | 20 | 13.00 | 14.45 | 11 |

Thus, in accordance with the principles of the present invention, a model that quantifies the performance impacts of round behavior is achieved and a system that predicts the average read duration time when one or multiple disk drives are connected to a bus can be implement in accordance with FIGS. 2 and 3 as discussed above.

said internal disk cache and requesting data corresponding to said following iteration using an asynchronous read transfer of a disk sector that is located just before said requesting data.

3. The method in accordance with claim 1, wherein said step (b) comprises the steps of transferring data located in said internal disk cache and requesting data corresponding to said following iteration using a non-blocking read transfer of a disk sector that is located just before said requesting data.

4. In a computer system having a plurality of disk drives each disc drive having an internal disk cache with a specified fence parameter value coupled to a host computer via a common bus, a method for scheduling access of data blocks located in each one of said disk drives, said method comprising the steps of:

(a) accessing the disk drive having the shortest minimum positioning time among said plurality of disk drives for accessing a first data block;

(b) sequentially accessing each of said remaining disk drives for a predetermined number of data blocks;

(c) transferring data from said disk drive to said internal disk cache in accordance with said specified fence parameter such that the size of the data transferred to said internal disk cache is equal to or smaller than the size of each of said data blocks;

(d) for a specified number of iterations, during a first iteration transferring data located in said internal disk cache to said common bus and requesting data corresponding to a following iteration to be transferred to said internal disk cache, based on information corresponding to data blocks that will be requested during said following iteration; and (e) repeating steps (a), (b), (c) and (d) until said specified number of iterations are completed.

5. The method in accordance with claim 4, wherein said step (b) comprises the steps of transferring data located in said internal disk cache and requesting data corresponding to said following iteration using an asynchronous read transfer of a disk sector that is located just before said requesting data.

6. The method in accordance with claim 4, wherein said step (b) comprises the steps of transferring data located in said internal disk cache and requesting data corresponding to said following iteration using a non-blocking read transfer of a disk sector that is located just before said requesting data.

* * * * *